J. McCLELLAND.
MEANS FOR CHANGING RECIPROCATING TO ROTARY MOTION.
APPLICATION FILED JULY 29, 1915.
1,161,235.
Patented Nov. 23, 1915.
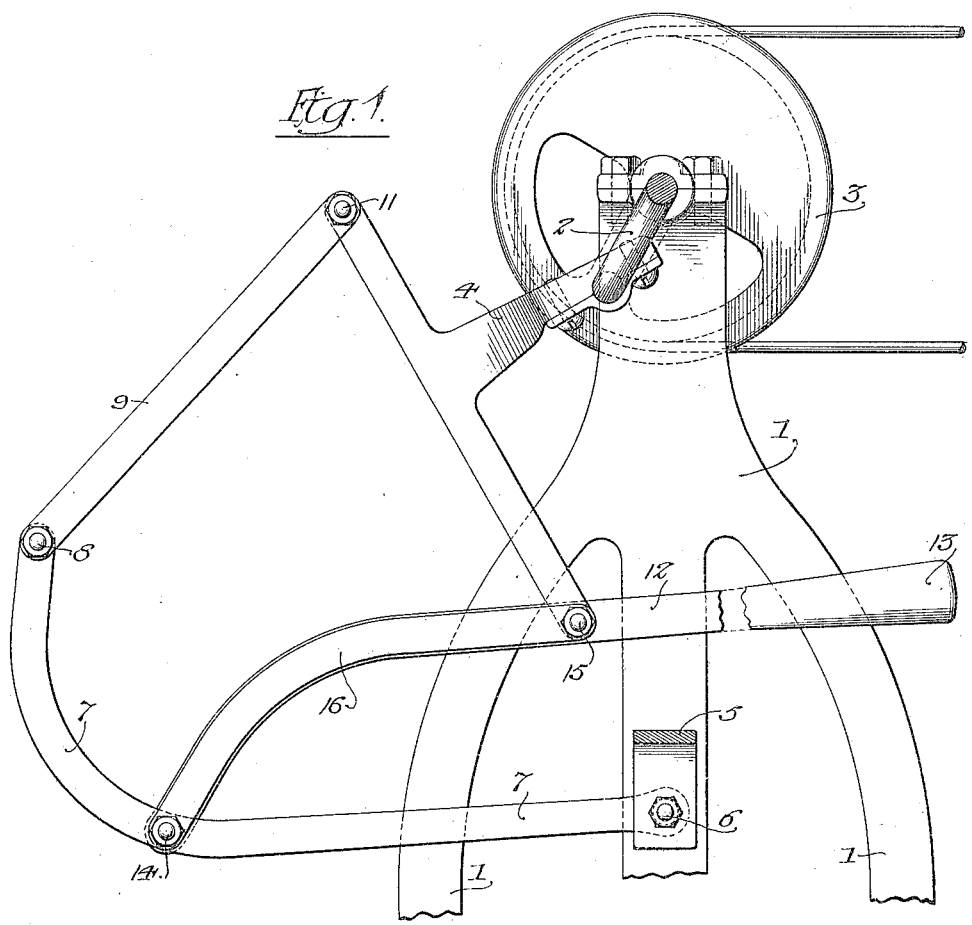
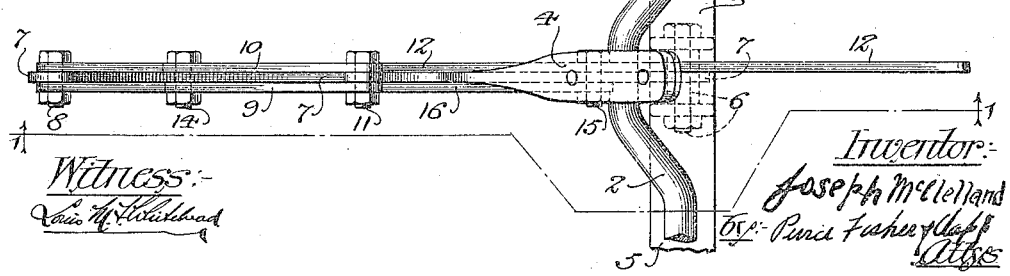

UNITED STATES PATENT OFFICE.

JOSEPH McCLELLAND, OF CHICAGO, ILLINOIS.

MEANS FOR CHANGING RECIPROCATING TO ROTARY MOTION.

1,161,235.  Specification of Letters Patent.  Patented Nov. 23, 1915.

Application filed July 29, 1915. Serial No. 42,516.

*To all whom it may concern:*

Be it known that I, JOSEPH McCLELLAND, a citizen of the United States, and a resident of Chicago, county of Cook, and State of Illinois, have invented certain new and useful Improvements in Means for Changing Reciprocating to Rotary Motion, of which I do declare the following to be a full, clear, and exact description.

My invention has for its object to provide a simple mechanism by which reciprocating motion can be readily transformed into rotary motion through the instrumentality of a plurality of levers.

A further object is to provide such a mechanism in which the loss of power will be eliminated as nearly as possible.

Figure 1 is a section on the line 1—1 of Fig. 2. Fig. 2 is a plan view of my device with portions broken away.

1 designates the main supporting frame which may be of any desired form having a bearing arranged at its upper extremity in which is journaled a crank 2. A fly-wheel 3 is rigidly secured to one end of the crank 2 while a connecting bar 4 engages said crank. A cross support 5 extends between the sides of the frame 1 and on this is pivotally mounted, as at 6, a lever 7 curved upwardly as shown. The upper end of the lever 7 pivotally engages at 8 one end of a link preferably formed in two sections 9 and 10. The other end of the link pivotally engages, as at 11, the upper extremity of the connecting bar 4. A driving lever 12 is provided having a handle 13 formed on one end thereof and having its opposite end downwardly curved and pivotally connected at 14 with the lever 7 intermediate the ends thereof. The lower end of the connecting bar 4 is pivotally connected to the floating or driving lever 13, as at 15 and a connecting link 16 corresponding in curvature with the lever 12 extends between the pivotal connection 14 and the pivotal connection 15, although this link 16 is not essential.

From the foregoing it will be seen that a simple and efficient mechanism is provided, the operation of which is as follows:—When the device is in the position shown in Fig. 1, a lifting force is applied to the handle 13 and the rotary clockwise movement will be transferred to the pulley wheel 3. When the pulley wheel has passed through the one half of the revolution forward, pressure will then be applied to the handle and the levers will transfer this force to the wheel, effecting continuance of the rotation thereof.

It is obvious that numerous changes may be made in this construction and attention is called to the fact that in the drawings the device is designed primarily to rotate the crank in a clockwise direction. Obviously, however, by a simple reversal of the movement the pulley may be rotated in the opposite direction.

It is obvious that numerous changes may be made in the details set forth without departure from the essentials of the invention.

Having thus described my invention, what I claim as new, and desire to secure by Letters Patent, is;—

1. The combination with a rotary element having a crank, of means for rotating the same comprising a lever having a fixed pivot at one end, a driving lever pivoted at one end to said first mentioned lever, a connecting bar pivoted to said driving lever intermediate its ends and pivoted also to said crank, and a link pivotally connected to said first mentioned lever and said connecting bar.

2. The combination with a rotary element having a crank, of means for rotating the same comprising a lever having a fixed pivot at one end, a driving lever pivoted at one end to said first mentioned lever, a T-shaped connecting bar pivoted at one end to said driving lever and having an arm pivoted to said crank, and a link pivotally connected to the other end of said connecting bar and to said first mentioned lever.

JOSEPH McCLELLAND.

Copies of this patent may be obtained for five cents each, by addressing the "Commissioner of Patents, Washington, D. C."